US008948053B2

(12) United States Patent
Kolavennu

(10) Patent No.: US 8,948,053 B2
(45) Date of Patent: Feb. 3, 2015

(54) APPARATUS AND METHOD FOR DETECTING CRITICAL NODES AND CRITICAL LINKS IN A MULTI-HOP NETWORK

(75) Inventor: Soumitri N. Kolavennu, Blaine, MN (US)

(73) Assignee: Honeywell International Inc., Morristown, NJ (US)

( * ) Notice: Subject to any disclaimer, the term of this patent is extended or adjusted under 35 U.S.C. 154(b) by 167 days.

(21) Appl. No.: 13/230,535

(22) Filed: Sep. 12, 2011

(65) Prior Publication Data
US 2013/0064139 A1    Mar. 14, 2013

(51) Int. Cl.
*H04L 12/28*    (2006.01)
*H04L 12/751*    (2013.01)
*H04L 12/24*    (2006.01)
*H04W 40/24*    (2009.01)

(52) U.S. Cl.
CPC ............... *H04L 45/02* (2013.01); *H04L 41/12* (2013.01); *H04W 40/24* (2013.02)
USPC ....................................................... 370/255

(58) Field of Classification Search
USPC ....................................................... 370/255
See application file for complete search history.

(56) References Cited

U.S. PATENT DOCUMENTS

| 7,403,988 | B1 | 7/2008 | Blouin et al. |
| 7,457,860 | B2 | 11/2008 | Shang et al. |
| 7,610,367 | B2 | 10/2009 | Canright et al. |
| 7,889,679 | B2 | 2/2011 | Canright et al. |
| 7,925,599 | B2 | 4/2011 | Koren et al. |
| 8,166,204 | B2 | 4/2012 | Basu et al. |
| 2005/0114551 | A1 | 5/2005 | Basu et al. |
| 2006/0039286 | A1 | 2/2006 | Basu et al. |
| 2009/0059855 | A1 | 3/2009 | Nanda et al. |
| 2010/0271936 | A1 | 10/2010 | Allan et al. |

(Continued)

FOREIGN PATENT DOCUMENTS

WO    WO 2009/096793 A1    8/2009

OTHER PUBLICATIONS

Improving the topological resilience of mobile ad hoc networks, Tae-Hoon Kim, David Tipper, Prashant Krishnamurthy, A Lee Swindlehurst Oct. 25-28, 2009.*

(Continued)

*Primary Examiner* — Huy D Vu
*Assistant Examiner* — Kevin Cunningham

(57) ABSTRACT

A method includes obtaining a matrix defining a topology of a multi-hop network, where the topology identifies nodes and links between the nodes in the multi-hop network. The method also includes identifying one or more Eigenvalues and/or one or more Eigenvectors of the matrix. The method further includes determining whether the topology of the multi-hop network defines a disconnected network using the one or more Eigenvalues and/or the one or more Eigenvectors. For example, one or more Eigenvalues of the matrix can be identified, and a determination can be made whether a second smallest Eigenvalue equals zero. As another example, Eigenvectors corresponding to two smallest Eigenvalues of the matrix can be identified, and a determination can be made whether the Eigenvectors have opposite zero and non-zero entries such that, for all entries in the Eigenvectors, an $i^{th}$ entry in one Eigenvector is zero while an $i^{th}$ entry in another Eigenvector is non-zero.

20 Claims, 8 Drawing Sheets

(56) References Cited

U.S. PATENT DOCUMENTS

| | | | |
|---|---|---|---|
| 2010/0322244 | A1 | 12/2010 | Dasylva et al. |
| 2011/0029675 | A1 | 2/2011 | Yeow et al. |
| 2011/0115794 | A1* | 5/2011 | Grabarnik et al. ............ 345/440 |
| 2013/0035922 | A1* | 2/2013 | Martens .......................... 703/11 |

OTHER PUBLICATIONS

William Liu, et al., "Weighted Algebraic Connectivity Metric for Non-Uniform Traffic in Reliable Network Design", 2009 IEEE, 6 pages.

Anna Abbagnale, et al., "Connectivity-Driven Routing for Cognitive Radio Ad-Hoc Networks", 2010 IEEE, 9 pages.

Carlos Pomalaza-Raez, "A Distributed Routing Algorithm for Multihop Packet Radio Networks with Uni- and Bi-Directional Links", 1994 IEEE, p. 233-237.

Muhammad Imran, et al., "Partitioning Detection and Connectivity Restoration Algorithm for Wireless Sesnor Actor Networks", 2010 IEEE/IFIP International Conference on Embedded and Ubiquitous Computing, p. 200-207.

Hongqing Zeng, et al., "A novel end-to-end fault detection and localization protocol for wavelength-routed WDM networks", Proc. of SPIE, vol. 5970, 2005, 8 pages.

Er. Rakesh Kumar, at al., "Design and Development of an Intelligent Routing Protocol for Mobile Ad hoc Network: A Review Paper", IJCSNS International Journal of Computer Science and Network Security, vol. 10, No. 9, Sep. 2010, p. 111-118.

Milenko Jorgic, et al., "Localized Algorithms for Detection of Critical Nodes and Links for Connectivity in Ad Hoc Networks", 2004, p. 360-371.

V. Anitha, et al., "Secured Message Transmission in Mobile AD HOC Networks throught Identification and Removal of Byzantine Failures", InterJRI Computer Science and Networking, vol. 2, Issue 1, Aug. 2010, p. 14-18.

Jang Woon Baek, et al., "Adaptive Multi-Path Routing with Guaranteed Target-Delivery Ratio of Critical Events in Wireless Sensor Networks", IEICE Trans. Commun., vol. E93-B, No. 2, Feb. 2010, p. 392-395.

Soumitri N. Kolavennu, "Apparatus and Method for Identifying Optimal Node Placement to Form Redundant Paths Around Critical Nodes and Critical Links in a Multi-Hop Network", U.S. Appl. No. 13/230,499, filed Sep. 12, 2011.

Communication pursuant to Article 94(3) EPC dated Dec. 6, 2012 in connection with European Patent Application No. 12 183 402.2.

Arindam K. Das, et al., "K-Node Connected Power Efficient Topologies in Wireless Networks with Sectored Antennas", Military Communications Conference, Oct. 17-20, 2005, 7 pages.

Tae-Hoon Kim, et al., "Improving the Connectivity of Heterogeneous Multi-Hop Wireless Networks", IEEE International Conference on Communications, Jun. 5-9, 2011, 6 pages.

Michael M. Zavlanos, et al., "Distributed Connectivity Control of Mobile Networks", Proceedings of the 46th IEEE Conference on Dicision and Control, Dec. 12-14, 2007, p. 3591-3596.

European Search Report dated Nov. 29, 2012 in connection with European Patent Application No. 12 183 402.2, 4 pages.

Soumendra Nanda, et al., "Mesh-Mon: A multi-radio mesh monitoring and management system", Computer Communications, Elsevier Science Publishers BV, Amsterdam, Netherlands, volo. 31, No. 8, May 25, 2008, pp. 1588-1601.

Christos Gkantsidis, et al., "Towards Topology Aware Networks", Infocom 2007, 26th IEEE International Conference on Computer Communications, May 1, 2007, pp. 2591-2595.

European Search Report dated Jan. 30, 2013 in connection with European Application No. 12183389.1, 3 pages.

European Examination Report dated Feb. 8, 2013 in connection with European Application No. 12183389.1, 6 pages.

* cited by examiner

APPARATUS AND METHOD FOR DETECTING CRITICAL NODES AND CRITICAL LINKS IN A MULTI-HOP NETWORK

TECHNICAL FIELD

This disclosure relates generally to network analysis. More specifically, this disclosure relates to an apparatus and method for detecting critical nodes and critical links in a multi-hop network.

BACKGROUND

A "multi-hop network" generally refers to a network where items are transported to destinations over multiple nodes or "hops." For example, in wired and wireless communication networks, voice or data traffic is routinely routed over multiple hops to its destination. Specific examples include communication networks used in buildings, large industrial facilities, and Advanced Metering Infrastructure (AMI) systems. As another example, mobile networks can include wireless devices that constantly change positions and communicate over ever-changing communication links. Specific examples include swarms of unmanned aerial vehicles, groups of soldiers with mobile devices, or fleets of transport vehicles. As yet another example, a power distribution grid can route power to different customers over multiple transmission lines. As still other examples, transportation networks (such as road, rail, or air systems) can transport people or materials over different routes, and social networks may involve numerous people having different relationships.

A specific example of a multi-hop wireless network is a mesh network. In this type of network, data can be passed from a source node to a destination node directly or via one or more intermediate nodes. Consider a multi-hop sensor network where wireless sensors publish sensor readings to a gateway. Not all sensors may be in direct communication range to the gateway, so some sensors can send information to the gateway through other sensors that are closer to the gateway.

Multi-hop networks are often robust and resilient to node or link failures because the networks are often able to re-route or re-connect a path from a source node to a destination node when an intermediate node or link fails. For this reason, these types of networks are often called "self-healing" networks. Although the ability to self-heal is well developed, self-healing may not always be possible. The topology of a multi-hop network plays an important role in being able to send information from any given source node to any given destination node in the face of link and node failures.

The self-healing nature of multi-hop networks often gives designers and implementers a false hope that a network is robust to node and link failures, while the topology of the network may actually make it impossible for self-healing to occur. The inability of a multi-hop network to self-heal can cause various problems, ranging from inconvenient to life-threatening. For instance, the failure of a power distribution node could cause an inconvenient power loss to homeowners or businesses. The failure of a wireless node in a military network could prevent communications with a group of soldiers on a battlefield.

In conventional systems, a brute-force approach is often taken to identify when a network may be unable to self-heal. In this approach, the removal of a node from a network is simulated, and a determination is made whether routes exist from each potential source node to each potential destination node. If not, the loss of the removed node can divide the network and prevent self-healing. However, this approach is very time consuming and computationally intensive. Also, this approach is particularly problematic if the topology of a network is constantly changing.

SUMMARY

This disclosure provides an apparatus and method for detecting critical nodes and critical links in a multi-hop network.

In a first embodiment, a method includes obtaining a matrix defining a topology of a multi-hop network, where the topology identifies nodes and links between the nodes in the multi-hop network. The method also includes identifying one or more Eigenvalues and/or one or more Eigenvectors of the matrix. The method further includes determining whether the topology of the multi-hop network defines a disconnected network using the one or more Eigenvalues and/or the one or more Eigenvectors.

In a second embodiment, an apparatus includes at is least one memory unit configured to store a matrix defining a topology of a multi-hop network, where the topology identifies nodes and links between the nodes in the multi-hop network. The apparatus also includes at least one processing unit configured to identify one or more Eigenvalues and/or one or more Eigenvectors of the matrix and determine whether the topology of the multi-hop network defines a disconnected network using the one or more Eigenvalues and/or the one or more Eigenvectors.

In a third embodiment, a computer readable medium embodies a computer program. The computer program includes computer readable program code for obtaining a matrix defining a topology of a multi-hop network, where the topology identifies nodes and links between the nodes in the multi-hop network. The computer program also includes computer readable program code for identifying one or more Eigenvalues and/or one or more Eigenvectors of the matrix. The computer program further includes computer readable program code for determining whether the topology of the multi-hop network defines a disconnected network using the one or more Eigenvalues and/or the one or more Eigenvectors.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6B, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
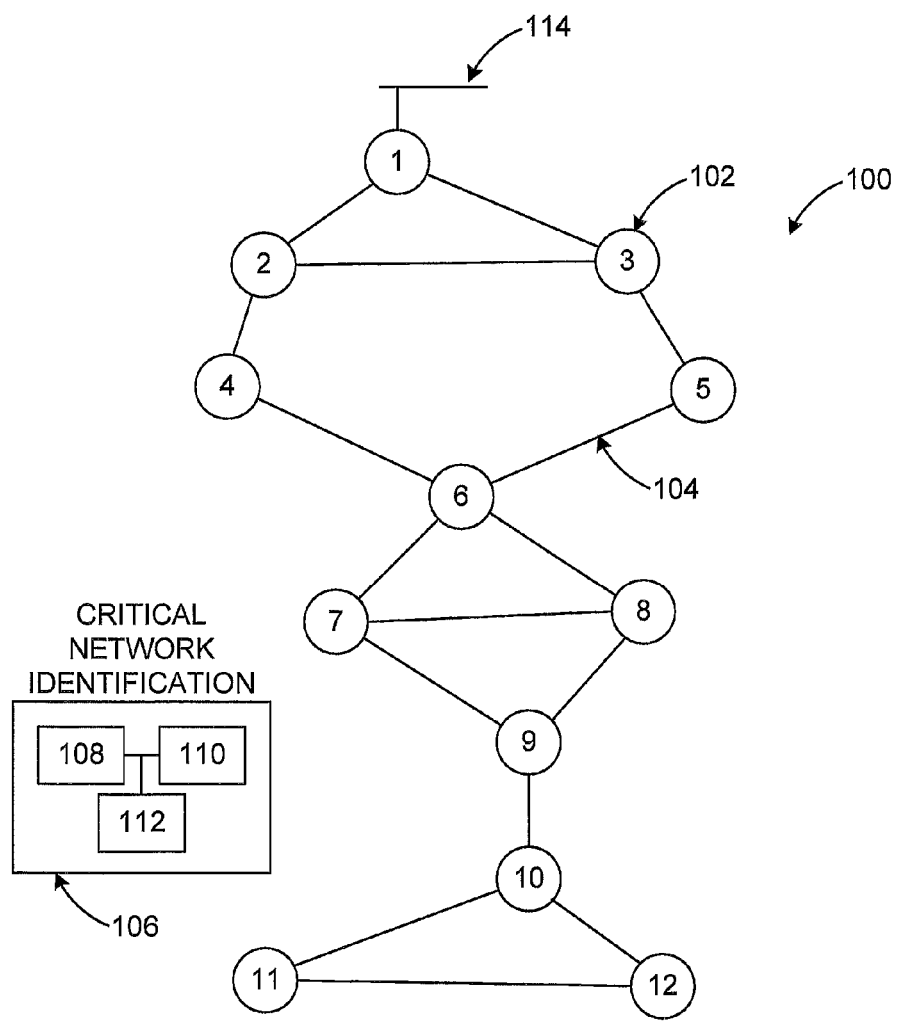
FIG. 1 illustrates an example multi-hop network according to this disclosure.

FIG. 1 illustrates an example multi-hop network 100 according to this disclosure. In FIG. 1, the network 100 is shown as generically including nodes 102 and links 104. The nodes 102 and links 104 represent various components depending on the network 100 being monitored. For example, in a wired or wireless communication system, the nodes 102 could represent communication devices, such as wired or wireless telephones, access points, routers, switches, or other devices used to transport information. Also, the links 104 could represent transmission media, such as copper or fiber optic cables or wireless links. In a power distribution system, the nodes 102 could represent distribution equipment, and the links 104 could represent electrical transmission lines. In transportation networks, the nodes 102 could represent locations or support facilities, such as airports, rail terminals, or cities. The links 104 could represent transportation lines, such as roads, rail lines, or air routes. In social networks, the nodes 102 could represent people, and the links 104 could represent relationships between those people.

These types of networks 100, nodes 102, and links 104 are non-exclusive examples of the types of multi-hop networks that can be monitored as described below. In general, any suitable multi-hop network 100 having any suitable components as nodes 102 and links 104 can be used. In the following discussion, it may be assumed that the network 100 is a wireless communication system with wireless devices (nodes 102) and wireless channels (links 104). However, any other suitable multi-hop network could be monitored. Note that the numbers and arrangements of nodes 102 and links 104 in FIG. 1 are for illustration only. A multi-hop network 100 could include any number of nodes 102 in any suitable arrangement, and those nodes 102 can be connected by any number of links 104. A specific multi-hop network could be confined to a small area or be city-wide, state-wide, country-wide, or even planet-wide in scope.

As noted above, the ability of a multi-hop network to self-heal depends on the current topology of the network. If the nodes 102 of the network 100 are arranged in a manner such that the failure of a node 102 or link 104 isolates at least one node 102 from the remaining nodes 102 in the network 100, the network 100 lacks the ability to self-heal. This is typically an undesirable situation.

In accordance with this disclosure, a critical network identification device 106 analyzes the multi-hop network 100 in order to identify critical nodes and/or critical links in the network 100. A critical node represents a node 102 in a multi-hop network 100 whose loss would prevent communication between two or more remaining nodes 102 in the network 100. Similarly, a critical link represents a link 104 in a multi-hop network 100 whose loss would prevent communication between two or more nodes 102 in the network 100. In other words, a critical node or link is a node 102 or link 104 that, if lost, would split the network 100 into at least two isolated islands or unconnected sub-networks. In general, a critical link is between two critical nodes, so the number of critical links in a network is less than the number of critical nodes in the network. The critical nodes and critical links are a graph topology property of a network 100 and are typically independent of any gateway (a node 102 coupled to a wired network 114), except when a gateway itself is a critical node.

Note that in some embodiments, a gateway may not be considered a critical node, even if its loss isolates the remaining nodes in the network.

In FIG. 1, the critical nodes are node #6, node #9, and node #10. If node #6 fails, the network 100 is split into two unconnected sub-networks (nodes #1-#5 and nodes #7-#12). If node #9 fails, the network 100 is split into two unconnected sub-networks (nodes #1-#8 and nodes #10-#12). If node #10 fails, the network 100 is split into two unconnected sub-networks (nodes #1-#9 and nodes #11-#12). The only critical link in FIG. 1 is the link 104 between nodes #9 and #10. The loss of this link 104 splits the network 100 into two unconnected sub-networks (nodes #1-#9 and nodes #10-#12).

In the simplified example of FIG. 1, it is relatively easy to identify the critical nodes and critical links. However, this task becomes exceedingly difficult as more and more nodes 102 and links 104 are added to the network 100. For example, in a network 100 having five hundred nodes 102, there could be several thousand links 104. It may be difficult to manually view the network topology and identify any critical nodes and critical links. This may become virtually impossible if the nodes 102 are mobile and the network topology constantly changes. As noted above, the conventional brute-force approach is very time consuming and computationally intensive.

The critical network identification device 106 analyzes information associated with the multi-hop network 100 to identify critical nodes and critical links. For example, the identification device 106 can receive data identifying the current topology of the network 100. The network topology data could be generated or collected in any suitable manner, such as by performing an online discovery process if current topology information is not available. With the network topology data, the identification device 106 analyzes the data to identify the critical nodes and critical links. At that point, the critical nodes and critical links can be used in any suitable manner, such as to insert new nodes 102 into the network 100 so that redundant paths exist around the (previously) critical nodes and links.

Figure 2:
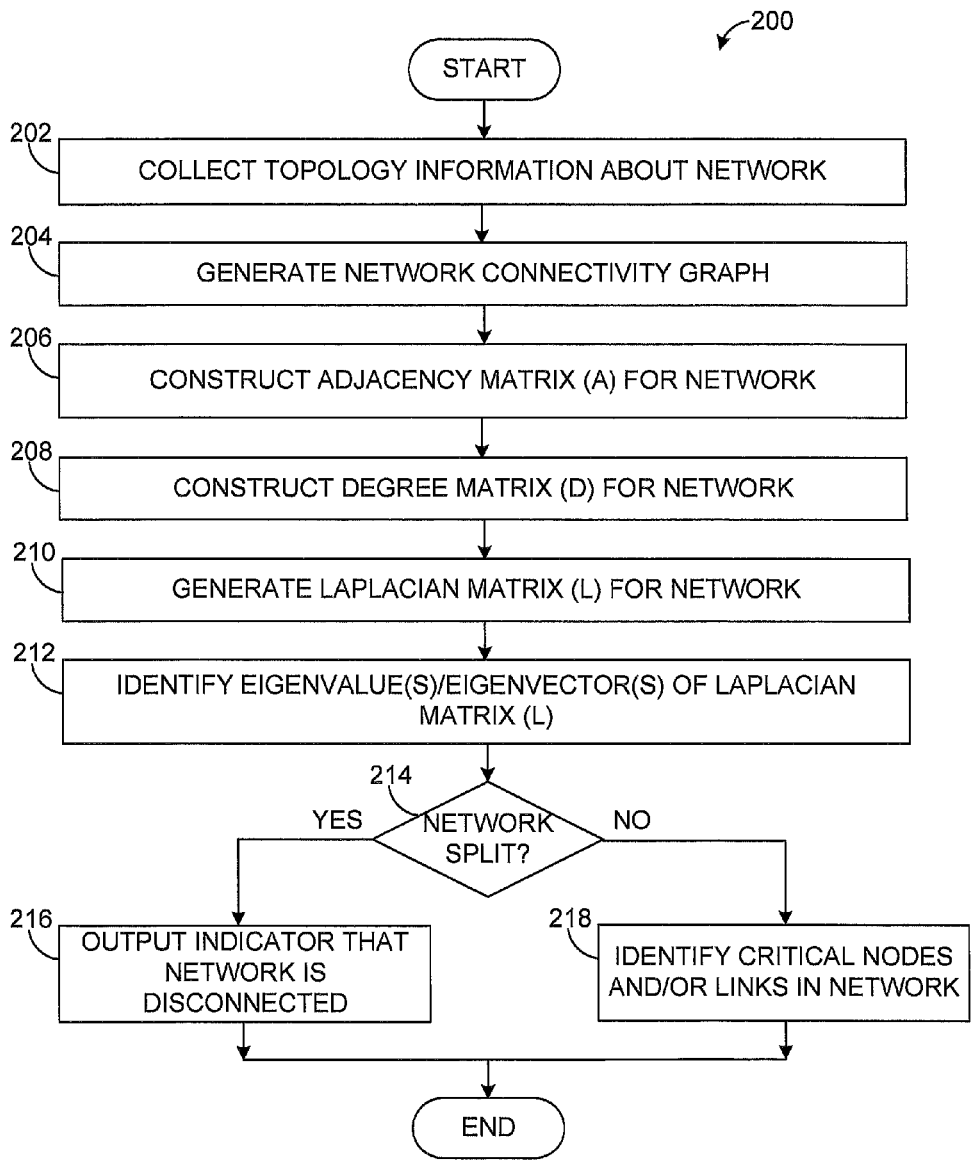
FIGS. 2 through 4 illustrate example methods for identifying critical nodes and critical links in a multi-hop network according to this disclosure.
Figure 3:
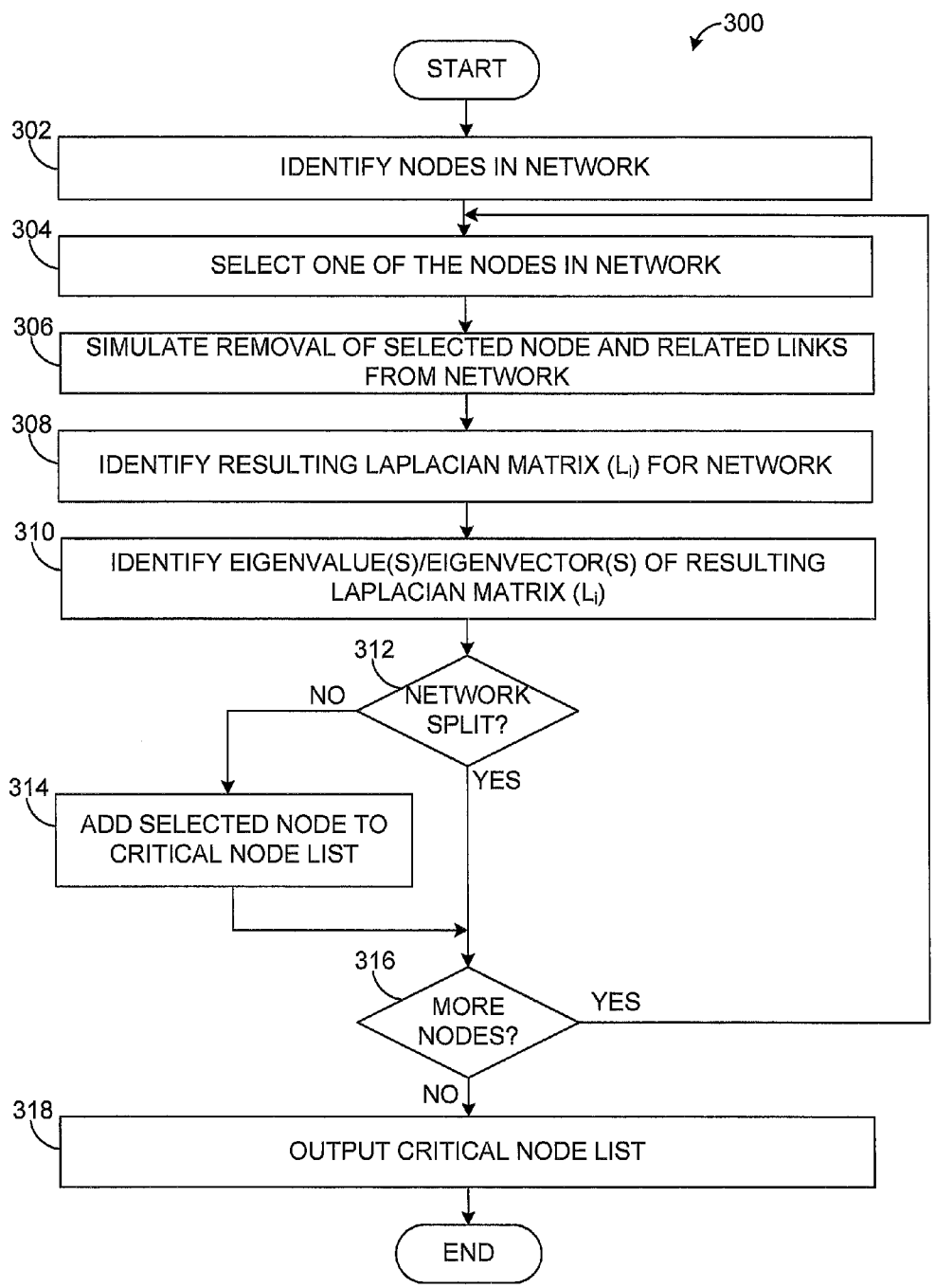
Figure 4:
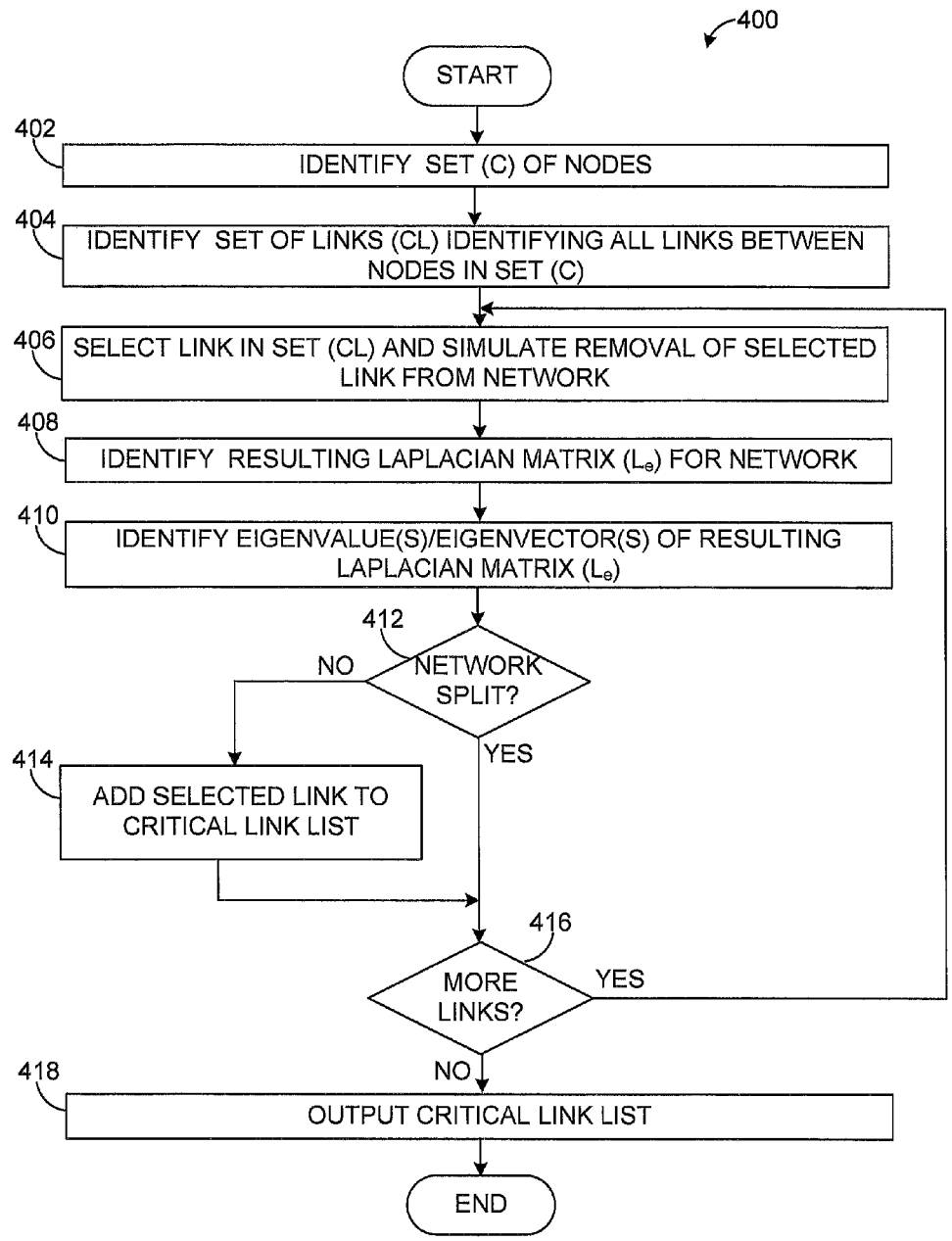

An example technique for identifying critical nodes and critical links is shown in FIGS. 2 through 4, which are described below. In this technique, the loss of one node 102 in the network 100 is simulated, and a matrix representation of the resulting network connectivity is obtained. Eigenvalues and/or Eigenvectors of the matrix are then calculated, and the Eigenvalues and/or Eigenvectors are used to determine whether the lost node 102 is a critical node. This process can be repeated for each node 102 to identify all of the critical nodes (if any) in the network 100. The critical nodes can then be used to identify any critical links (if any).

This technique can be implemented using fast computational algorithms, which can be applied repeatedly with changing network topologies. This can be particularly useful for wireless communication networks or other networks that are dynamic in the face of changing environments. As particular examples, mobile networks (such as those formed by moving soldiers on a battlefield or swarms of unmanned aerial vehicles or ground vehicles) can benefit from this technique.

Additional details regarding the operation of the critical network identification device 106 are provided below. The identification device 106 includes any suitable structure for identifying critical nodes and/or critical links in a multi-hop network. For example, the identification device 106 could be implemented using hardware only or a combination of hardware and software/firmware instructions.

In the example in FIG. 1, the identification device 106 is implemented using at least one processing unit 108, at least one memory unit 110, and at least one interface 112. The at least one processing unit 108 includes any suitable processing structure(s), such as a microprocessor, microcontroller, digital signal processor, application specific integrated circuit, or field programmable gate array. The at least one memory unit 110 includes any suitable volatile and/or non-volatile storage and retrieval device(s), such as a hard disk, an optical storage disc, RAM, or ROM. The at least one interface 112 includes any suitable structure(s) for providing data to one or more external destinations or receiving data from one or more external sources.

Data used by the identification device 106 could be provided to the identification device 106 in any suitable manner, such as over a network, using a portable memory device, or via user entry. Also, data generated by the identification device 106 could be provided or used in any suitable manner, such as presented on a display or transmitted via electronic messages.

The embodiment in FIG. 1 represents one specific way in which the identification device 106 can be implemented. Other implementations of the identification device 106 could be used. When implemented using software and/or firmware, the identification device 106 may include any suitable program instructions that identify critical nodes and/or critical links.

Although FIG. 1 illustrates one example of a multi-hop network 100, various changes may be made to FIG. 1. For example, as described above, the network 100 could represent any suitable multi-hop network having nodes 102 and links 104. Also, the identification device 106 can reside in any suitable location(s) within or outside the network 100. Further, while often described as identifying both critical nodes and critical links, the identification device 106 could provide the identification of only critical nodes or only critical links. In addition, the functional division shown in FIG. 1 is for illustration only. Various components in FIG. 1 could be combined, further subdivided, or omitted and additional components could be added according to specific needs. As a particular example, the functionality of the identification device 106 could be incorporated into one or more of the nodes 102.

FIGS. 2 through 4 illustrate example methods for identifying critical nodes and critical links in a multi-hop network according to this disclosure. For ease of explanation, the methods in FIGS. 2 through 4 are described as being performed by the identification device 106 for the multi-hop network 100 of FIG. 1. The methods could be used by any other device or system to analyze any suitable multi-hop network.

As shown in FIG. 2, a method 200 verifies that a multi-hop network is not already divided before critical nodes and/or critical links are identified. Topology information about a multi-hop network is collected at step 202. This could include, for example, the identification device 106 collecting information defining the nodes 102 and the links 104 between the nodes 102 in the network 100. The information defining the nodes 102 and links 104 in the network 100 can be obtained in any suitable manner. In some embodiments, the multi-hop network is generally static, and most or all nodes 102 and links 104 can be known ahead of time. In this case, data identifying the nodes 102 and links 104 could be retrieved from storage. However, network topology data could be obtained in other ways, such as automated analyses of network data or online collection.

In other embodiments, the multi-hop network is highly dynamic (meaning the nodes 102 and/or links 104 can constantly change), and it may not be possible to identify the nodes 102 or links 104 ahead of time. In this case, the identification device 106 can instruct the nodes 102 in the network 100 to provide information identifying their neighbors to the identification device 106. In these embodiments, each node 102 could maintain or generate a table or other data structure identifying any neighboring node (a node communicatively coupled to that node by a link). The nodes 102 could then make that information available to the identification device 106.

In particular embodiments, the network topology information could be obtained through a controlled flooding of route request messages within the network 100. This could be useful if the nodes 102 do not or cannot obtain a list of their neighboring nodes. For example, this could involve using two nodes 102 in the network 100. Once the nodes 102 join the network 100, a first node 102 sends a broadcast-based route request message to a second node 102. Route message information is flooded in the network 100, and each node 102 that receives the route request message inserts its own address and re-broadcasts the message. Normally, the second node 102 would send a route reply upon receipt of the route request message. However, for discovering network topology, the second node 102 can simply collect all received route request messages, and these messages allow the second node 102 or another component (such as the device 106) to sufficiently identify the topology of the network 100. Note that in other embodiments, the second node could represent the identification device 106 (assuming the device 106 can participate in the network 100). In that case, the first node 102 can transmit a broadcast-based route request message to the device 106, which can collect the messages to thereby collect the network topology information.

However the topology information is obtained, a network connectivity graph is generated at step 204. This could include, for example, the identification device 106 generating one or more data structures that identify each of the nodes 102 in the network 100 and each of the links 104 between the nodes 102. The data defining the nodes 102 and links 104 can be structured in any suitable format. In particular embodiments, the network connectivity graph could be defined as a collection of nodes (representing the nodes 102) and edges (representing the links 104).

An adjacency matrix (A) for the multi-hop network is generated at step 206. The adjacency matrix is a matrix representation identifying the links 104 between the nodes 102. The adjacency matrix is an n×n matrix, where n denotes the number of nodes 102 in the network 100. The adjacency matrix is constructed so that the $(i,j)^{th}$ element in the matrix has a value (such as one) if node i is connected to node j by a link 104 and another value (such as zero) otherwise. Mathematically, this can be expressed as:

$$A(i, j) = \begin{cases} 1 & \text{if } (i, j) \in E \\ 0 & \text{otherwise} \end{cases}.$$

Here, $A(i,j)$ denotes the matrix entry for the $i^{th}$ node (in the $i^{th}$ row) and the $j^{th}$ node (in the $j^{th}$ column). Also, $(i,j) \in E$ indicates that a link 104 between the $i^{th}$ node and the $j^{th}$ node is listed as an edge in the network connectivity graph.

For the network 100 shown in FIG. 1, the adjacency matrix can be expressed as follows:

$$A = \begin{bmatrix} 0 & 1 & 1 & 0 & 0 & 0 & 0 & 0 & 0 & 0 & 0 & 0 \\ 1 & 0 & 1 & 1 & 0 & 0 & 0 & 0 & 0 & 0 & 0 & 0 \\ 1 & 1 & 0 & 0 & 1 & 0 & 0 & 0 & 0 & 0 & 0 & 0 \\ 0 & 1 & 0 & 0 & 0 & 1 & 0 & 0 & 0 & 0 & 0 & 0 \\ 0 & 0 & 1 & 0 & 0 & 1 & 0 & 0 & 0 & 0 & 0 & 0 \\ 0 & 0 & 0 & 1 & 1 & 0 & 1 & 1 & 0 & 0 & 0 & 0 \\ 0 & 0 & 0 & 0 & 0 & 1 & 0 & 1 & 1 & 0 & 0 & 0 \\ 0 & 0 & 0 & 0 & 0 & 1 & 1 & 0 & 1 & 0 & 0 & 0 \\ 0 & 0 & 0 & 0 & 0 & 0 & 1 & 1 & 0 & 1 & 0 & 0 \\ 0 & 0 & 0 & 0 & 0 & 0 & 0 & 0 & 1 & 0 & 1 & 1 \\ 0 & 0 & 0 & 0 & 0 & 0 & 0 & 0 & 0 & 1 & 0 & 1 \\ 0 & 0 & 0 & 0 & 0 & 0 & 0 & 0 & 0 & 1 & 1 & 0 \end{bmatrix}$$

The diagonal values are zero since a node 102 does not have a link 104 to itself. In this matrix, the one values in the sixth row are in the fourth, fifth, seventh, and eighth columns. This indicates that node #6 is linked directly to nodes #4, #5, #7, and #8 as shown in FIG. 1.

A degree matrix (D) for the multi-hop network is generated at step 208. The degree matrix identifies the degree of each node 102, or the number of links 104 that each node 102 has. The degree matrix is also an n×n matrix. The degree matrix is constructed so that all off-diagonal elements are zero. Each $(i,i)^{th}$ diagonal element in the degree matrix equals the number of links 104 connected to the $i^{th}$ node 102.

For the network 100 shown in FIG. 1, the degree matrix can be expressed as follows:

$$D = \begin{bmatrix} 2 & 0 & 0 & 0 & 0 & 0 & 0 & 0 & 0 & 0 & 0 & 0 \\ 0 & 3 & 0 & 0 & 0 & 0 & 0 & 0 & 0 & 0 & 0 & 0 \\ 0 & 0 & 3 & 0 & 0 & 0 & 0 & 0 & 0 & 0 & 0 & 0 \\ 0 & 0 & 0 & 2 & 0 & 0 & 0 & 0 & 0 & 0 & 0 & 0 \\ 0 & 0 & 0 & 0 & 2 & 0 & 0 & 0 & 0 & 0 & 0 & 0 \\ 0 & 0 & 0 & 0 & 0 & 4 & 0 & 0 & 0 & 0 & 0 & 0 \\ 0 & 0 & 0 & 0 & 0 & 0 & 3 & 0 & 0 & 0 & 0 & 0 \\ 0 & 0 & 0 & 0 & 0 & 0 & 0 & 3 & 0 & 0 & 0 & 0 \\ 0 & 0 & 0 & 0 & 0 & 0 & 0 & 0 & 3 & 0 & 0 & 0 \\ 0 & 0 & 0 & 0 & 0 & 0 & 0 & 0 & 0 & 3 & 0 & 0 \\ 0 & 0 & 0 & 0 & 0 & 0 & 0 & 0 & 0 & 0 & 2 & 0 \\ 0 & 0 & 0 & 0 & 0 & 0 & 0 & 0 & 0 & 0 & 0 & 2 \end{bmatrix}$$

For shorthand, this diagonal matrix can be expressed as:

D=diag[2 3 3 2 2 4 3 3 3 3 2 2].

In this matrix, the sixth column contains a value of four, indicating that the sixth node 102 has four links 104 to four neighboring nodes as shown in FIG. 1.

A Laplacian matrix (L) for the multi-hop network is generated at step 210. The Laplacian matrix is calculated by subtracting the adjacency matrix (A) from the degree matrix (D). Because of the structures of the adjacency and degree matrices, the diagonal values of the Laplacian matrix equal the diagonal values of the degree is matrix. Also, the off-diagonal values of the Laplacian matrix equal negative off-diagonal values of the adjacency matrix. Mathematically, this can be expressed as:

$$L_{i,j} = \begin{cases} -1 & \text{if } (i,j) \in E \\ d_i & \text{if } i = j \\ 0 & \text{otherwise} \end{cases}$$

Here, $d_i$ denotes the degree of the $i^{th}$ node, and −1 denotes the inverted values from the adjacency matrix. Note that the Laplacian matrix could also be generated directly using the above mathematical expression.

For the network 100 shown in FIG. 1, the Laplacian matrix (L) can be expressed as follows:

$$L = \begin{bmatrix} 2 & -1 & -1 & 0 & 0 & 0 & 0 & 0 & 0 & 0 & 0 & 0 \\ -1 & 3 & -1 & -1 & 0 & 0 & 0 & 0 & 0 & 0 & 0 & 0 \\ -1 & -1 & 3 & 0 & -1 & 0 & 0 & 0 & 0 & 0 & 0 & 0 \\ 0 & -1 & 0 & 2 & 0 & -1 & 0 & 0 & 0 & 0 & 0 & 0 \\ 0 & 0 & -1 & 0 & 2 & -1 & 0 & 0 & 0 & 0 & 0 & 0 \\ 0 & 0 & 0 & -1 & -1 & 4 & -1 & -1 & 0 & 0 & 0 & 0 \\ 0 & 0 & 0 & 0 & 0 & -1 & 3 & -1 & -1 & 0 & 0 & 0 \\ 0 & 0 & 0 & 0 & 0 & -1 & -1 & 3 & -1 & 0 & 0 & 0 \\ 0 & 0 & 0 & 0 & 0 & 0 & -1 & -1 & 3 & -1 & 0 & 0 \\ 0 & 0 & 0 & 0 & 0 & 0 & 0 & 0 & -1 & 3 & -1 & -1 \\ 0 & 0 & 0 & 0 & 0 & 0 & 0 & 0 & 0 & -1 & 2 & -1 \\ 0 & 0 & 0 & 0 & 0 & 0 & 0 & 0 & 0 & -1 & -1 & 2 \end{bmatrix}.$$

One or more Eigenvalues and/or one or more Eigenvectors are identified for the Laplacian matrix at step 212. For a square matrix c, if cv=λv for a scalar value λ and a non-zero vector v, the scalar value λ is an Eigenvalue, and the non-zero vector v is an Eigenvector. Any suitable technique can be used to calculate the Eigenvalues and/or Eigenvectors. In the Laplacian matrix given above for the network 100 in FIG. 1, the calculated Eigenvalues are:

0, 0.174, 0.632, . . . .

The Eigenvector for the second smallest Eigenvalue (0.174) for this Laplacian matrix is:

[0.336, 0.307, 0.307, 0.224, 0.224, 0.103,
−0.028, −0.028, −0.153, −0.378, −0.458, −0.458].

A determination is made whether the network is divided or split at step 214. In some embodiments, this can be done by determining whether the second smallest Eigenvalue equals zero. If so, this indicates that the network 100 being analyzed is divided or split, meaning there are at least two islands of nodes 102 that cannot communicate with one another over the existing links 104. A non-zero second smallest Eigenvalue indicates that the network 100 being analyzed is not divided or split, meaning communications between all nodes 102 in the network 100 are possible over the existing links 104.

In other embodiments, this can be done by determining whether the Eigenvectors corresponding to the two smallest Eigenvalues have the form (for example):

[0 0 0 $k_4$ $k_5$ $k_6$ . . . ] or
[$p_1$ $p_2$ $p_3$ . . . 0 0 0].

In other words, a determination is made whether the two Eigenvectors have some zero and non-zero elements, where the indices of zero elements in the first Eigenvector are the indices of the non-zero elements in the second Eigenvector and vice versa. Note that the zero and non-zero elements in the Eigenvectors need not be contiguous. If the network 100 is not split, this condition is not met.

If the network is divided, an indication that the network is currently disconnected is output at step 216. This could include, for example, presenting an indicator on a display device or otherwise providing the indicator to a user. If the network is not divided, the identification of critical nodes and/or critical links in the network occurs at step 218.

FIG. 3 illustrates an example method 300 for identifying critical nodes, which could occur during step 218 in FIG. 2. As shown in FIG. 3, the nodes in a network being analyzed are identified at step 302. This could include, for example, the identification device 106 identifying the nodes 102 in the network connectivity graph generated in FIG. 2.

One of the nodes is selected at step 304, and the removal of that node and its related links from the network is simulated at step 306. A Laplacian matrix ($L_i$) for the resulting network is identified at step 308. This could include, for example, the identification device 106 selecting a node 102 for removal based on its network identifier or any other suitable criteria. This could also include the identification device 106 generating the Laplacian matrix ($L_i$) for the network as modified (with the selected node 102 and related links 104 removed). In particular embodiments, the Laplacian matrix (L) generated during the method 200 could be updated to generate the Laplacian matrix ($L_i$). This can be done by (i) deleting the $k^{th}$ row and the $k^{th}$ column (where k represents the removed node 102) and (ii) decrementing the diagonal value for any remaining row where the deleted $k^{th}$ column previously contained a non-zero entry. The resulting Laplacian matrix ($L_i$) is an (n−1)×(n−1) matrix. In other embodiments, the Laplacian matrix ($L_i$) could be identified directly or indirectly, such as by generating an adjacency matrix and a degree matrix for the modified network and then calculating the Laplacian matrix ($L_i$).

One or more Eigenvalues and/or one or more Eigenvectors are identified for the Laplacian matrix ($L_i$) at step 310, and a determination is made whether the modified network is divided or split at step 312. In some embodiments, this can be done by determining whether the second smallest Eigenvalue for the Laplacian matrix ($L_i$) equals zero. In other embodiments, this can be done by determining whether the Eigenvectors for the two smallest Eigenvalues of the Laplacian matrix ($L_i$) have opposite zero and non-zero entries.

If the modified network is split, the selected node that was removed is a critical node whose loss would prevent self-healing of the network. As a result, the selected node is added to a critical node list at step 314. The critical node list includes any suitable data structure identifying the critical nodes that have been identified in the network 100. Each critical node can be identified in any suitable manner, such as by network address, numerical or other identifier, or other suitable information.

A determination is made whether any additional nodes remain to be processed at step 316. In some embodiments, each node 102 in the network 100 is associated with a numerical identifier, such as numerical identifiers ranging from 1 to n. In this case, the method 300 could loop n times, where each loop involves removing the node 102 associated with the current iteration of the loop. Note is that during each loop, the removal of only one node 102 may be simulated (meaning the removal of nodes is not cumulative from one loop to the next). If at least one node 102 remains to be processed, the method 300 returns to step 304, where another node is selected for removal. If not, the removal of each node has been simulated, and the critical node list is output at step 318.

Figure 5A:
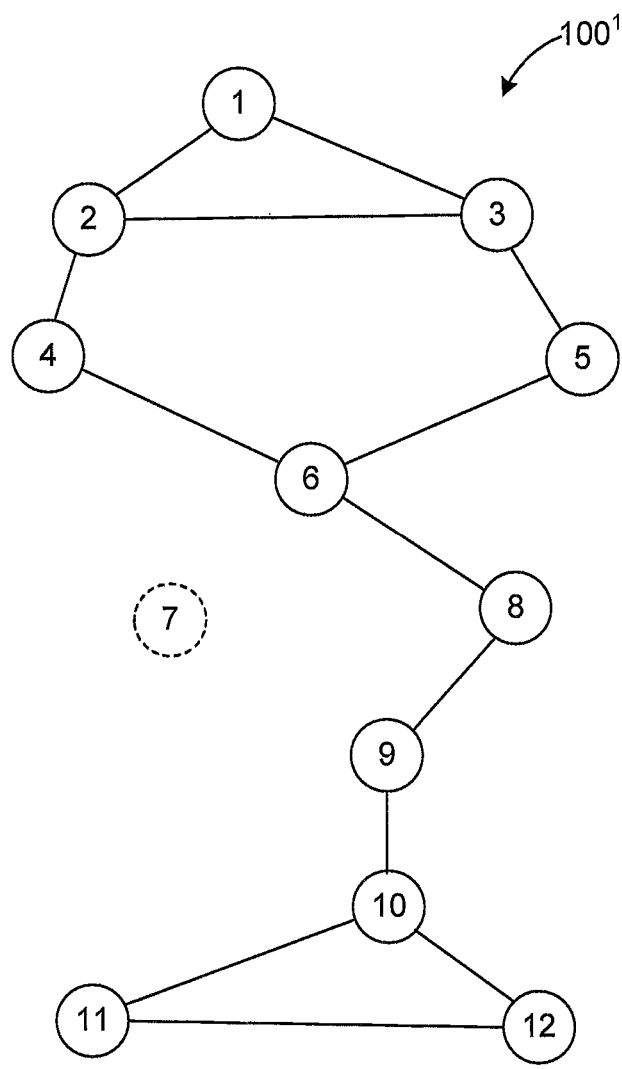
FIGS. 5A and 5B illustrate example simulated node removals in a multi-hop network according to this disclosure.
Figure 5B:
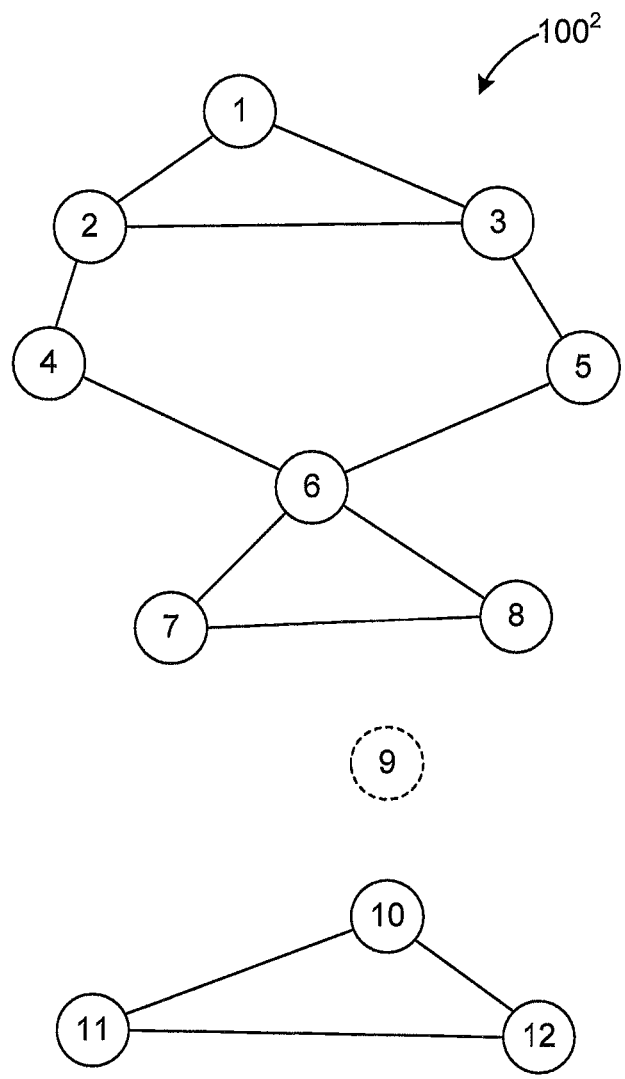

Examples of this process are shown in FIGS. 5A and 5B. FIGS. 5A and 5B illustrate example simulated node removals in the multi-hop network 100 according to this disclosure. As shown in FIG. 5A, removal of node #7 in the network has been simulated. The Laplacian matrix ($L_i$) for the resulting network $100^1$ in FIG. 5A can be expressed as follows:

$$L_i = \begin{bmatrix} 2 & -1 & -1 & 0 & 0 & 0 & 0 & 0 & 0 & 0 & 0 \\ -1 & 3 & -1 & -1 & 0 & 0 & 0 & 0 & 0 & 0 & 0 \\ -1 & -1 & 3 & 0 & -1 & 0 & 0 & 0 & 0 & 0 & 0 \\ 0 & -1 & 0 & 2 & 0 & -1 & 0 & 0 & 0 & 0 & 0 \\ 0 & 0 & -1 & 0 & 2 & -1 & 0 & 0 & 0 & 0 & 0 \\ 0 & 0 & 0 & -1 & -1 & 3 & -1 & 0 & 0 & 0 & 0 \\ 0 & 0 & 0 & 0 & 0 & -1 & 2 & -1 & 0 & 0 & 0 \\ 0 & 0 & 0 & 0 & 0 & 0 & -1 & 2 & -1 & 0 & 0 \\ 0 & 0 & 0 & 0 & 0 & 0 & 0 & -1 & 3 & -1 & -1 \\ 0 & 0 & 0 & 0 & 0 & 0 & 0 & 0 & -1 & 2 & -1 \\ 0 & 0 & 0 & 0 & 0 & 0 & 0 & 0 & -1 & -1 & 2 \end{bmatrix}.$$

For this Laplacian matrix ($L_i$), the calculated Eigenvalues are:
  0, 0.125, 0.744, . . . .
The Eigenvector associated with the second smallest Eigenvalue (0.125) for this Laplacian matrix is:
  [0.315, 0.295, 0.295, 0.238, 0.238, 0.152,
  −0.040, −0.227, −0.385, −0.441, −0.441].
In this case, the network $100^1$ is not split since (i) the second smallest Eigenvalue is non-zero and (ii) the Eigenvector does not have zero values as entries. As a result, node #7 is not a critical node.

As shown in FIG. 5B, removal of node #9 in the network has been simulated. The Laplacian matrix ($L_i$) for the resulting network $100^2$ in FIG. 5B can be expressed as follows:

$$L_i = \begin{bmatrix} 2 & -1 & -1 & 0 & 0 & 0 & 0 & 0 & 0 & 0 & 0 \\ -1 & 3 & -1 & -1 & 0 & 0 & 0 & 0 & 0 & 0 & 0 \\ -1 & -1 & 3 & 0 & -1 & 0 & 0 & 0 & 0 & 0 & 0 \\ 0 & -1 & 0 & 2 & 0 & -1 & 0 & 0 & 0 & 0 & 0 \\ 0 & 0 & -1 & 0 & 2 & -1 & 0 & 0 & 0 & 0 & 0 \\ 0 & 0 & 0 & -1 & -1 & 4 & -1 & -1 & 0 & 0 & 0 \\ 0 & 0 & 0 & 0 & 0 & -1 & 2 & -1 & 0 & 0 & 0 \\ 0 & 0 & 0 & 0 & 0 & -1 & -1 & 2 & 0 & 0 & 0 \\ 0 & 0 & 0 & 0 & 0 & 0 & 0 & 0 & 2 & -1 & -1 \\ 0 & 0 & 0 & 0 & 0 & 0 & 0 & 0 & -1 & 2 & -1 \\ 0 & 0 & 0 & 0 & 0 & 0 & 0 & 0 & -1 & -1 & 2 \end{bmatrix}.$$

For this Laplacian matrix ($L_i$), the calculated Eigenvalues are:
  0, 0, 0.496, . . . .
The Eigenvectors associated with the first two Eigenvalues (both zero) are:
  [0, 0, 0, 0, 0, 0, 0, 0, −0.577, −0.577, −0.577]
and
  [0.354, 0.354, 0.354, 0.354, 0.354, 0.354,
  0.354, 0.354, 0, 0, 0].
In this case, the network $100^2$ is split since (i) the second smallest Eigenvalue is zero and (ii) the Eigenvectors are arranged such that the non-zero elements in first Eigenvector (elements #9, #10 and #11) are zero in the second Eigenvector and vice versa. In other words, the $i^{th}$ entry in one Eigenvector is zero while the $i^{th}$ entry in another Eigenvector is non-zero for all entries. As a result, node #9 is a critical node.

FIG. 4 illustrates an example method 400 for identifying critical links, which could occur during step 218 in FIG. 2. As shown in FIG. 4, a set of nodes (C) is identified at step 402. This could include, for example, adding all nodes 102 from the critical node list created in FIG. 3 to the set (C). This could also include adding all "one hop" neighbors of the critical nodes to the set (C). A "one hop" neighbor represents an immediate neighbor to a node, or a neighbor that communicates directly with the node. A set of links (CL) is generated at step 404. The set (CL) includes all links 104 between the nodes 102 in the set (C). Alternatively, steps 402-404 could simply involve identifying a set (CL) of links 104 over which any critical nodes communicate.

One of the links in the set (CL) is selected and the removal of that link is simulated at step 406. A Laplacian matrix ($L_e$) for the resulting network is identified at step 408. This could include, for example, the identification device 106 selecting a link 104 from the set (CL) for removal based on any suitable criteria. This could also include the identification device 106 generating the Laplacian matrix ($L_e$) for the network as modified (with the selected link 104 removed). In particular embodiments, the Laplacian matrix (L) generated during the method 200 could be updated to generate the Laplacian matrix ($L_e$). This can be done by (i) zeroing the matrix entries for the selected link 104 and (ii) decrementing the diagonal values for the two nodes 102 associated with the selected link 104. The resulting Laplacian matrix ($L_e$) is an n×n matrix. In other embodiments, the Laplacian matrix ($L_e$) could be identified directly or indirectly, such as by generating an adjacency matrix and a degree matrix for the modified network and then calculating the Laplacian matrix ($L_e$).

One or more Eigenvalues and/or one or more Eigenvectors are identified for the Laplacian matrix ($L_e$) at step 410, and a determination is made whether the modified network is divided or split at step 412. In some embodiments, this can be done by determining whether the second smallest Eigenvalue for the Laplacian matrix ($L_e$) equals zero. In other embodiments, this can be done by determining whether the Eigenvectors corresponding to the two smallest Eigenvalues for the Laplacian matrix ($L_e$) have opposite zero and non-zero entries.

If the modified network is split, the selected link that was removed is a critical link whose loss would prevent self-healing of the network. As a result, the selected link is added to a critical link list at step 414. The critical link list includes any suitable data structure identifying the critical links that have been identified in the network 100. Each critical link can be identified in any suitable manner, such as by network addresses of the nodes 102 coupled by the link 104, numerical or other identifier, or other suitable information.

A determination is made whether any additional links in the set (CL) remain to be processed at step 416. In some embodiments, each link 104 in the set (CL) is associated with a numerical identifier, such as numerical identifiers ranging from 1 to m. In this case, the method 400 could loop m times, where each loop involves removing the link 104 associated with the current iteration of the loop. Note that during each loop, the removal of only one link 104 may be simulated (meaning the removal of links is not cumulative from one loop to the next). If at least one link 104 remains to be processed, the method 400 returns to step 406, where another link is selected for removal. If not, the removal of each link has been simulated, and the critical link list is output at step 418.

Figure 6A:
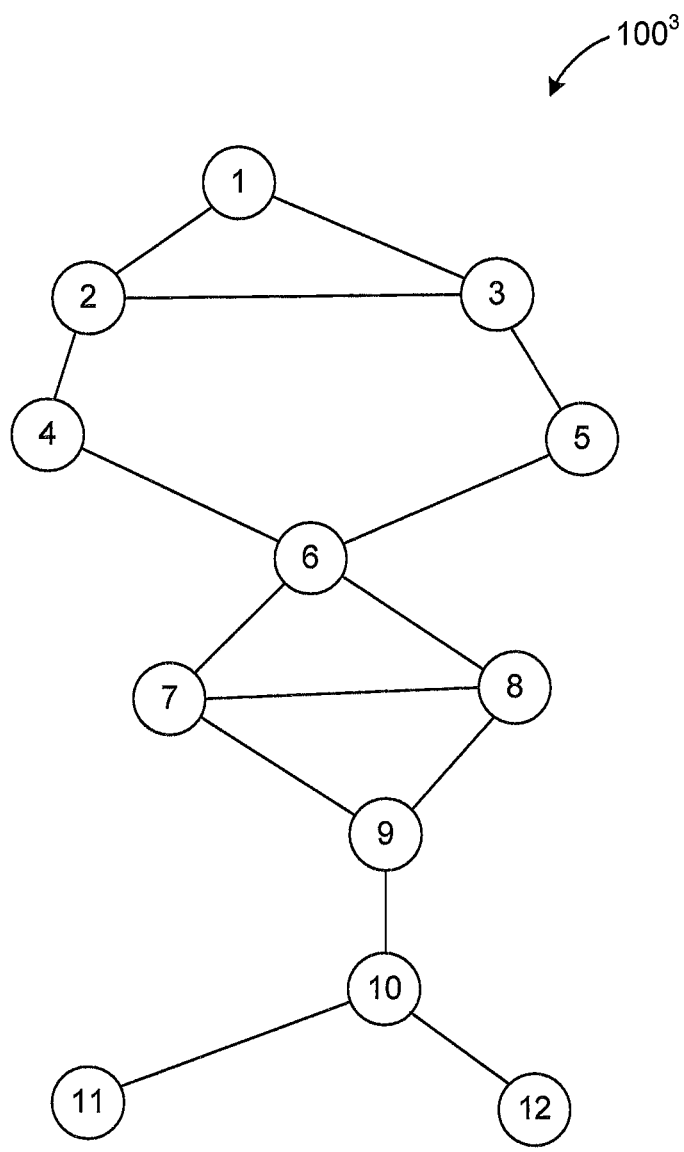
FIGS. 6A and 6B illustrate example simulated link removals in a multi-hop network according to this disclosure.
Figure 6B:
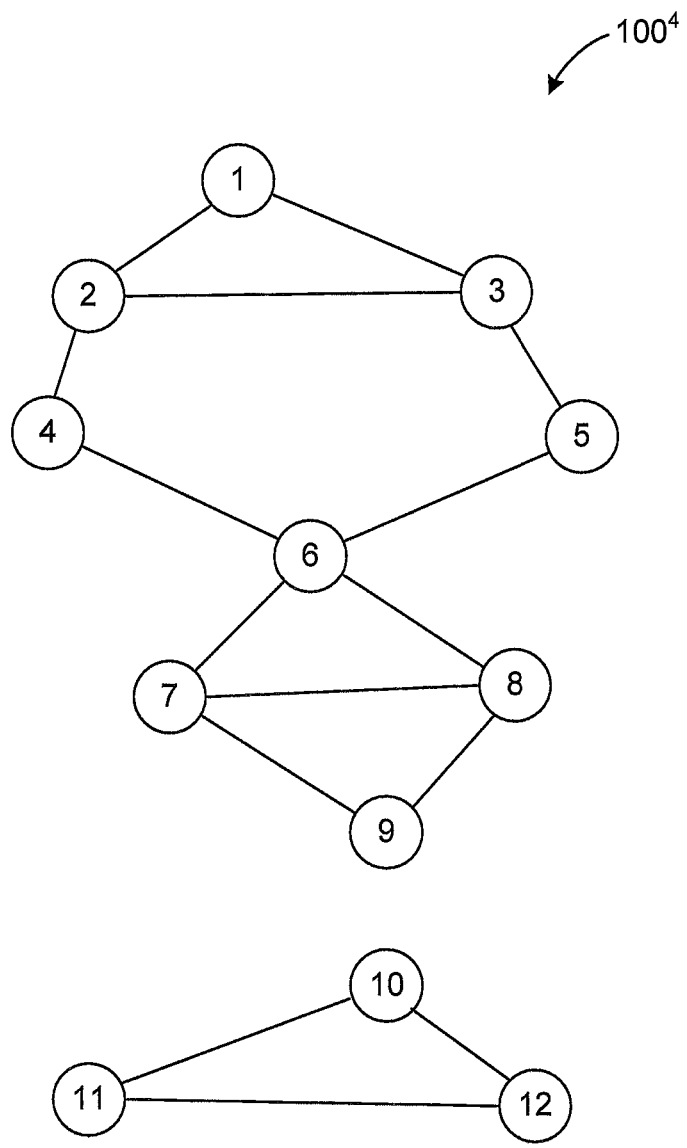

Examples of this process are shown in FIGS. 6A and 6B. FIGS. 6A and 6B illustrate example simulated link removals in the multi-hop network 100 according to this disclosure. As shown in FIG. 6A, removal of the link between node #11 and node #12 has been simulated. The Laplacian matrix ($L_e$) for the resulting network $100^3$ in FIG. 6A can be expressed as follows:

$$L_e = \begin{bmatrix} 2 & -1 & -1 & 0 & 0 & 0 & 0 & 0 & 0 & 0 & 0 & 0 \\ -1 & 3 & -1 & -1 & 0 & 0 & 0 & 0 & 0 & 0 & 0 & 0 \\ -1 & -1 & 3 & 0 & -1 & 0 & 0 & 0 & 0 & 0 & 0 & 0 \\ 0 & -1 & 0 & 2 & 0 & -1 & 0 & 0 & 0 & 0 & 0 & 0 \\ 0 & 0 & -1 & 0 & 2 & -1 & 0 & 0 & 0 & 0 & 0 & 0 \\ 0 & 0 & 0 & -1 & -1 & 4 & -1 & -1 & 0 & 0 & 0 & 0 \\ 0 & 0 & 0 & 0 & 0 & -1 & 3 & -1 & -1 & 0 & 0 & 0 \\ 0 & 0 & 0 & 0 & 0 & -1 & -1 & 3 & -1 & 0 & 0 & 0 \\ 0 & 0 & 0 & 0 & 0 & 0 & -1 & -1 & 3 & -1 & 0 & 0 \\ 0 & 0 & 0 & 0 & 0 & 0 & 0 & 0 & -1 & 3 & -1 & -1 \\ 0 & 0 & 0 & 0 & 0 & 0 & 0 & 0 & 0 & -1 & 1 & 0 \\ 0 & 0 & 0 & 0 & 0 & 0 & 0 & 0 & 0 & -1 & 0 & 1 \end{bmatrix}.$$

For this Laplacian matrix ($L_e$), the calculated Eigenvalues are:

0, 0.174, 0.744, . . . .

The Eigenvector associated with the second smallest Eigenvalue (0.174) for this Laplacian matrix is:

[0.336, 0.307, 0.307, 0.224, 0.224, 0.103, −0.028, −0.028, −0.153, −0.378, −0.458, −0.458].

In this case, the network $100^3$ is not split since (i) the second smallest Eigenvalue is non-zero and (ii) the Eigenvector does not have zero values as entries. As a result, the link 104 between nodes #11 and #12 is not a critical node.

As shown in FIG. 6B, removal of the link 104 between node #9 and node #10 has been simulated. The Laplacian matrix ($L_e$) for the resulting network $100^4$ in FIG. 6B can be expressed as follows:

$$L_e = \begin{bmatrix} 2 & -1 & -1 & 0 & 0 & 0 & 0 & 0 & 0 & 0 & 0 & 0 \\ -1 & 3 & -1 & -1 & 0 & 0 & 0 & 0 & 0 & 0 & 0 & 0 \\ -1 & -1 & 3 & 0 & -1 & 0 & 0 & 0 & 0 & 0 & 0 & 0 \\ 0 & -1 & 0 & 2 & 0 & -1 & 0 & 0 & 0 & 0 & 0 & 0 \\ 0 & 0 & -1 & 0 & 2 & -1 & 0 & 0 & 0 & 0 & 0 & 0 \\ 0 & 0 & 0 & -1 & -1 & 4 & -1 & -1 & 0 & 0 & 0 & 0 \\ 0 & 0 & 0 & 0 & 0 & -1 & 3 & -1 & -1 & 0 & 0 & 0 \\ 0 & 0 & 0 & 0 & 0 & -1 & -1 & 3 & -1 & 0 & 0 & 0 \\ 0 & 0 & 0 & 0 & 0 & 0 & -1 & -1 & 2 & 0 & 0 & 0 \\ 0 & 0 & 0 & 0 & 0 & 0 & 0 & 0 & 0 & 2 & -1 & -1 \\ 0 & 0 & 0 & 0 & 0 & 0 & 0 & 0 & 0 & -1 & 2 & -1 \\ 0 & 0 & 0 & 0 & 0 & 0 & 0 & 0 & 0 & -1 & -1 & 2 \end{bmatrix}.$$

For this Laplacian matrix ($L_e$), the calculated Eigenvalues are:

0, 0, 0.390, . . . .

The Eigenvectors associated with the first two Eigenvalues (both zero) are:

[0, 0, 0, 0, 0, 0, 0, 0, 0, −0.577, −0.577, −0.577]

and

[0.333, 0.333, 0.333, 0.333, 0.333, 0.333, 0.333, 0.333, 0.333, 0, 0, 0].

In this case, the network $100^4$ is split since (i) the second smallest Eigenvalue is zero and (ii) the Eigenvectors are such that the non-zero elements in first Eigenvector (elements #10, #11 and #12) are zero in the second Eigenvector and vice versa. As a result, the link 104 between nodes #9 and #10 is a critical link.

As can be seen here, this disclosure provides a technique for quickly identifying critical nodes and/or critical links in a multi-hop network. The technique is faster and less computationally intensive compared to standard brute-force approaches. Moreover, this technique can be easily used as a network's topology changes. Once the critical nodes and/or critical links have been identified, this information can be used in any suitable manner. For instance, this information could be used to determine how additional nodes 102 can be added to a network 100 so that at least one redundant path exists around a critical node or critical link.

Although FIGS. 2 through 4 illustrate examples of methods for identifying critical nodes and critical links in a multi-hop network, various changes may be made to FIGS. 2 through 4. For example, the method 400 could be omitted if only the identity of critical nodes is desired, and the method 300 could be omitted if only the identity of critical links is desired. Moreover, both of the methods 300 and 400 can be omitted if it is desired to only identify whether a network is currently disconnected. Further, steps 202-216 in the method 200 could be omitted if it is known that a network is currently not divided. In addition, while shown as a series of steps, the steps in each figure could overlap, occur in parallel, or occur any number of times.

Although FIGS. 5A through 6B illustrate examples of simulated node removals and simulated link removals in a multi-hop network, various changes may be made to FIGS. 5A through 6B. For example, other node or link removals can be simulated in the multi-hop network 100.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   using one or more processing devices, during each of multiple iterations of a loop:
   obtaining a matrix defining a topology of a multi-hop network associated with a current iteration of the loop, the topology identifying nodes and links between the nodes in the multi-hop network, the matrix for the current iteration of the loop constructed by simulating removal of a different one of the nodes from the multi-hop network compared to other iterations of the loop;
   identifying at least one of: one or more Eigenvalues and one or more Eigenvectors of the matrix; and
   determining whether the topology of the multi-hop network associated with the current iteration of the loop defines a disconnected network using at least one of: the one or more Eigenvalues and the one or more Eigenvectors;
   generating, using the one or more processing devices, a list of critical nodes in the multi-hop network, each critical node representing one of the nodes in the network whose removal divides the network so that at least one remaining node in the network cannot communicate with at least one other remaining node in the network;
   identifying, using the one or more processing devices, a set of links to or from the critical nodes in the list; and
   iteratively processing, using the one or more processing devices, the links in the set of links to determine whether each link in the set of links is a critical link in the multi-hop network, each critical link representing one of the links in the network whose removal divides the network so that at least one node in the network cannot communicate with at least one other node in the network;
   wherein generating the list of critical nodes in the multi-hop network comprises, for each iteration of the loop in which a determination is made that the topology of the multi-hop network defines a disconnected network, including the node removed from the multi-hop network during that iteration in the list.

2. The method of claim 1, wherein each iteration of the loop comprises:
   identifying one or more Eigenvalues of the matrix; and
   determining whether a second smallest Eigenvalue equals zero;
   wherein the topology of the multi-hop network associated with the current iteration of the loop defines a disconnected network when the second smallest Eigenvalue equals zero.

3. The method of claim 1, wherein each iteration of the loop comprises:
   identifying Eigenvectors corresponding to two smallest Eigenvalues of the matrix; and
   determining whether the Eigenvectors have opposite zero and non-zero entries such that, for all entries in the Eigenvectors, an $i^{th}$ entry in one Eigenvector is zero while an $i^{th}$ entry in another Eigenvector is non-zero;
   wherein the topology of the multi-hop network associated with the current iteration of the loop defines a disconnected network when the Eigenvectors have opposite zero and non-zero entries.

4. The method of claim 1, wherein iteratively processing the links in the set of links comprises:
   during each of multiple iterations of a second loop, where each iteration of the second loop is associated with a selected one of the links in the set of links:
   generating a second matrix associated with a topology of the multi-hop network constructed by simulating removal of the selected link from the multi-hop network;

identifying at least one of: one or more second Eigenvalues and one or more second Eigenvectors of the second matrix;

determining whether the topology of the multi-hop network associated with the current iteration of the second loop defines a disconnected network using at least one of: the one or more second Eigenvalues and the one or more second Eigenvectors; and when the topology of the multi-hop network associated with the current iteration of the second loop defines a disconnected network, adding the selected link associated with the current iteration of the second loop to a list of critical links.

5. The method of claim 1, wherein the multi-hop network comprises a dynamic network in which the nodes or links change.

6. The method of claim 1, further comprising:
using identified critical nodes or critical links to insert new nodes into the multi-hop network so that redundant paths exist around the identified critical nodes or critical links.

7. The method of claim 1, wherein:
the matrix comprises a Laplacian matrix having rows and columns, each node of the network associated with one of the rows and one of the columns;
an $(i,j)^{th}$ entry in the matrix indicates whether a link exists between the $i^{th}$ node and the $j^{th}$ node; and
an $(i,i)^{th}$ entry in the matrix identifies a degree of the $i^{th}$ node.

8. The method of claim 7, wherein obtaining the matrix comprises:
generating an adjacency matrix identifying the links in the multi-hop network;
generating a degree matrix identifying the degree of each node in the multi-hop network; and
subtracting the adjacency matrix from the degree matrix.

9. An apparatus comprising:
at least one processing device configured to:
during each of multiple iterations of a loop:
obtain a matrix defining a topology of a multi-hop network associated with a current iteration of the loop, the topology identifying nodes and links between the nodes in the multi-hop network, the matrix for the current iteration of the loop constructed by simulating removal of a different one of the nodes from the multi-hop network compared to other iterations of the loop;
identify at least one of: one or more Eigenvalues and one or more Eigenvectors of the matrix; and
determine whether the topology of the multi-hop network associated with the current iteration of the loop defines a disconnected network using at least one of: the one or more Eigenvalues and the one or more Eigenvectors;
generate a list of critical nodes in the multi-hop network, each critical node representing one of the nodes in the network whose removal divides the network so that at least one remaining node in the network cannot communicate with at least one other remaining node in the network;
identify a set of links to or from the critical nodes in the list; and
iteratively process the links in the set of links to determine whether each link in the set of links is a critical link in the multi-hop network, each critical link representing one of the links in the network whose removal divides the network so that at least one node in the network cannot communicate with at least one other node in the network; and at least one memory device configured to store each matrix and identified critical nodes or critical links;

wherein the at least one processing device is configured to generate the list of critical nodes in the multi-hop network by, for each iteration of the loop in which a determination is made that the topology of the multi-hop network defines a disconnected network, including the node removed from the multi-hop network during that iteration in the list.

10. The apparatus of claim 9, wherein, during each iteration of the loop, the at least one processing device is configured to:
identify one or more Eigenvalues of the matrix; and
determine whether a second smallest Eigenvalue equals zero; and
wherein the topology of the multi-hop network associated with the current iteration of the loop defines a disconnected network when the second smallest Eigenvalue equals zero.

11. The apparatus of claim 9, wherein, during each iteration of the loop, the at least one processing device is configured to:
identify Eigenvectors corresponding to two smallest Eigenvalues of the matrix; and
determine whether the Eigenvectors have opposite zero and non-zero entries such that, for all entries in the Eigenvectors, an $i^{th}$ entry in one Eigenvector is zero while an $i^{th}$ entry in another Eigenvector is non-zero; and
wherein the topology of the multi-hop network associated with the current iteration of the loop defines a disconnected network when the Eigenvectors have opposite zero and non-zero entries.

12. The apparatus of claim 9, wherein the at least one processing device is configured to iteratively process the links in the set of links by:
during each of multiple iterations of a second loop, where each iteration of the second loop is associated with a selected one of the links in the set of links:
generating a second matrix associated with a topology of the multi-hop network constructed by simulating removal of the selected link from the multi-hop network;
identifying at least one of: one or more second Eigenvalues and one or more second Eigenvectors of the second matrix;
determining whether the topology of the multi-hop network associated with the current iteration of the second loop defines a disconnected network using at least one of: the one or more second Eigenvalues and the one or more second Eigenvectors; and
when the topology of the multi-hop network associated with the current iteration of the second loop defines a disconnected network, adding the selected link associated with the current iteration of the second loop to a list of critical links.

13. The apparatus of claim 9, wherein the at least one processing device is configured to obtain the matrix in each iteration of the loop by:
generating an adjacency matrix identifying the links in the multi-hop network;
generating a degree matrix identifying the degree of each node in the multi-hop network; and subtracting the adjacency matrix from the degree matrix to generate a Laplacian matrix having rows and columns, each node of the network associated with one of the rows and one of the columns.

14. The apparatus of claim 9, wherein:
the matrix comprises a Laplacian matrix having rows and columns, each node of the network associated with one of the rows and one of the columns;
an $(i,j)^{th}$ entry in the matrix indicates whether a link exists between the $i^{th}$ node and the $j^{th}$ node; and
an $(i,i)^{th}$ entry in the matrix identifies a degree of the $i^{th}$ node.

15. A non-transitory computer readable medium embodying a computer program, the computer program comprising computer readable program code for:
during each of multiple iterations of a loop:
obtaining a matrix defining a topology of a multi-hop network associated with a current iteration of the loop, the topology identifying nodes and links between the nodes in the multi-hop network, the matrix for the current iteration of the loop constructed by simulating removal of a different one of the nodes from the multi-hop network compared to other iterations of the loop;
identifying at least one of: one or more Eigenvalues and one or more Eigenvectors of the matrix; and
determining whether the topology of the multi-hop network associated with the current iteration of the loop defines a disconnected network using at least one of: the one or more Eigenvalues and the one or more Eigenvectors;
generating a list of critical nodes in the multi-hop network, each critical node representing one of the nodes in the network whose removal divides the network so that at least one remaining node in the network cannot communicate with at least one other remaining node in the network;
identifying a set of links to or from the critical nodes in the list; and
iteratively processing the links in the set of links to determine whether each link in the set of links is a critical link in the multi-hop network, each critical link representing one of the links in the network whose removal divides the network so that at least one node in the network cannot communicate with at least one other node in the network;
wherein the computer readable program code for generating the list of critical nodes in the multi-hop network comprises computer readable program code for including, for each iteration of the loop in which a determination is made that the topology of the multi-hop network defines a disconnected network, the node removed from the multi-hop network during that iteration in the list.

16. The computer readable medium of claim 15, wherein the computer readable program code for iteratively processing the links in the set of links comprises computer readable program code for:
during each of multiple iterations of a second loop, where each iteration of the second loop is associated with a selected one of the links in the set of links:
generating a second matrix associated with a topology of the multi-hop network constructed by simulating removal of the selected link from the multi-hop network;
identifying at least one of: one or more second Eigenvalues and one or more second Eigenvectors of the second matrix;
determining whether the topology of the multi-hop network associated with the current iteration of the second loop defines a disconnected network using at least one of: the one or more second Eigenvalues and the one or more second Eigenvectors; and
when the topology of the multi-hop network associated with the current iteration of the second loop defines a disconnected network, adding the selected link associated with the current iteration of the second loop to a list of critical links.

17. The computer readable medium of claim 15, wherein the computer readable program code for obtaining the matrix in each iteration of the loop comprises computer readable program code for:
generating an adjacency matrix identifying the links in the multi-hop network;
generating a degree matrix identifying the degree of each node in the multi-hop network; and
subtracting the adjacency matrix from the degree matrix to generate a Laplacian matrix having rows and columns, each node of the network associated with one of the rows and one of the columns.

18. The computer readable medium of claim 15, wherein:
the matrix comprises a Laplacian matrix having rows and columns, each node of the network associated with one of the rows and one of the columns;
an $(i,i)^{th}$ entry in the matrix indicates whether a link exists between the $i^{th}$ node and the $j^{th}$ node; and
an $(i,i)^{th}$ entry in the matrix identifies a degree of the $i^{th}$ node.

19. The computer readable medium of claim 15, wherein:
the computer readable program code for identifying at least one of the one or more Eigenvalues and the one or more Eigenvectors comprises computer readable program code for, during each iteration of the loop, identifying one or more Eigenvalues of the matrix; and
the computer readable program code for determining whether the topology of the multi-hop network associated with the current iteration of the loop defines a disconnected network comprises computer readable program code for, during each iteration of the loop, determining whether a second smallest Eigenvalue equals zero;
wherein the topology of the multi-hop network associated with the current iteration of the loop defines a disconnected network when the second smallest Eigenvalue equals zero.

20. The computer readable medium of claim 15, wherein:
the computer readable program code for identifying at least one of the one or more Eigenvalues and the one or more Eigenvectors comprises computer readable program code for, during each iteration of the loop, identifying Eigenvectors corresponding to two smallest Eigenvalues of the matrix; and
the computer readable program code for determining whether the topology of the multi-hop network associated with the current iteration of the loop defines a disconnected network comprises computer readable program code for, during each iteration of the loop, determining whether the Eigenvectors have opposite zero and non-zero entries such that, for all entries in the Eigenvectors, an $i^{th}$ entry in one Eigenvector is zero while an $i^{th}$ entry in another Eigenvector is non-zero;
wherein the topology of the multi-hop network associated with the current iteration of the loop defines a disconnected network when the Eigenvectors have opposite zero and non-zero entries.

* * * * *